United States Patent [19]

Kamitani

[11] Patent Number: 5,067,855
[45] Date of Patent: Nov. 26, 1991

[54] CASING FOR CONTAINING CAMERAS, VIDEOCAMERAS, FLASHLIGHTS PORTABLE RADIOS AND OTHER ARTICLES WHICH CAN BE USED IN SCUBA DIVING

[76] Inventor: Shigeki Kamitani, 8-1-933, Nakahara 1-chome, Isogo-ku, Yokohama-shi, Kanagawa-ken, 235, Japan

[21] Appl. No.: 438,207

[22] Filed: Nov. 20, 1989

[30] Foreign Application Priority Data

Nov. 21, 1988 [JP] Japan ............................ 63-151498[U]

[51] Int. Cl.⁵ ...................... B63C 11/02; B63C 11/44
[52] U.S. Cl. ..................................... 405/186; 405/193
[58] Field of Search ........................ 405/186, 193, 192

[56] References Cited

U.S. PATENT DOCUMENTS

| | | | |
|---|---|---|---|
| 4,324,507 | 4/1982 | Harrah | 405/186 |
| 4,601,609 | 7/1986 | Hyde | 405/186 |
| 4,903,628 | 2/1990 | Lansford | 405/193 X |

FOREIGN PATENT DOCUMENTS 0291550 11/1988 European Pat. Off. .

Primary Examiner—Dennis L. Taylor
Assistant Examiner—J. Russell McBee
Attorney, Agent, or Firm—Cushman, Darby & Cushman

[57] ABSTRACT

Disclosed is an improved casing for containing cameras, videocameras, flashlights, portable radios and other articles which can be used in scuba diving. It is designed to cause the inner pressure of the casing to vary and balance with the surrounding water pressure. It is guaranteed free from deformation, collapse or water invasion in underwater use without using thick strong wall or frame structure.

7 Claims, 4 Drawing Sheets

CASING FOR CONTAINING CAMERAS, VIDEOCAMERAS, FLASHLIGHTS PORTABLE RADIOS AND OTHER ARTICLES WHICH CAN BE USED IN SCUBA DIVING

BACKGROUND OF THE INVENTION

1. Field of the Invention

The present invention relates to a casing for containing cameras, videocameras, flashlights, portable radios and other articles which can be used in scuba diving or a casing of such an article.

2. Description of the Prior Art

As is well known, scuba divers carry cameras, videocameras, flashlights, portable radios and other articles which can be used in scuba diving. These articles have a watertight casing, or they are contained in a separate watertight casing. Such casing must have a pressure resisting characteristic in addition to watertightness. The water pressure will increase 1 atm. for each increase of 10 meter depth. Recently, scuba divers are likely to swim at an increased depth, and therefore, the casing must be designed to have a good pressure resistance. Hitherto, in an attempt to assure the watertightness in such casings, improved packings have been proposed and actually used. Also, in an attempt to give a good pressure resistance to such casings the casing wall structure has been designed so as to have a good rigidity. This, however, has the following demerits:

1) The casing frame must be designed so as to have an increased rigidity. The resultant elaborate frame requires an increased number of parts and manufacturing steps. Accordingly the manufacturing cost increases.

2) In case the casing frame cannot be designed appropriately for the purpose of increasing its pressure resistivity, this problem must be solved with recourse to appropriate selection of material. This, however, is likely to limit selection of material from the angle of pleasing shape, accordingly reducing the freedom with which a casing can be designed.

3) An attempt to provide the pressure resistivity as much as required by increasing the rigidity of the casing wall will cause increase of the weight of the casing. Such casings are not difficult to handle in water, but they are different to carry to a scuba diver place on land.

SUMMARY OF THE INVENTION

With the above in mind the object of the present invention is to provide a casing structure for containing cameras, videocameras, flashlights, portable radios and other articles which can be used in scuba diving or provide a casing of such an article, which casing structure is capable of changing its inner pressure with the depth at which a scuba diver swims underwater, thereby preventing deformation or collapse of the casing without recourse to the designing of its frame and/or selection of its material.

To attain the object of the present invention a casing for containing cameras, videocameras, flashlights, portable radios and other articles which can be used in scuba diving comprises: a watertight casing and a secondary pressure-reduction valve assembly including a primary air-compartment for reducing the pressure of a primary air and providing a secondary air, and a secondary air compartment, which is connected to the inside of said watertight casing via a tube, thereby permitting the secondary air to flow from said secondary air-compartment to the inside of said watertight casing via said tube to balance the inner pressure of said watertight casing with the surrounding water pressure, said watertight casing or said secondary air-compartment being equipped with an exhaust valve, which is responsive to the rise of the inner pressure of said watertight casing above the surrounding water pressure for releasing the difference in pressure between the inside pressure of said watertight casing and the surrounding water pressure to the exterior of said watertight casing, thereby causing the inside pressure of said watertight casing to balance with the pressure of the surrounding water regardless of the depth at which a scuba diver swims underwater.

In operation the pressure of the compressed air in a portable tank is reduced when passing through the primary pressure reducing valve. Assume that a scuba diver swims at a depth "H" and the surrounding water pressure is "P". Then, the compressed air of pressure "P" appears in the secondary air-compartment, and therefore it flows into the casing, which is exposed to the surrounding water pressure "P". Thus, the inner pressure "P" of the casing will substantially balance with the outer pressure "P" of the casing, although a negligible small pressure difference may be caused by the level difference between the casing and the scuba diver in water.

Now, assume that the scuba diver comes up to the depth "h". Then, the surrounding water pressure reduces by $\Delta P$. Stated otherwise, the inner pressure of the casing (and of the secondary air-compartment of the secondary pressure reducing valve) is higher than the surrounding water pressure by $\Delta P$. On the other hand, the pressure $$(P - \Delta P + T_{(pressing\ force)})$$

is applied to the exhaust valve. At the moment $\Delta P > T$, the air will be ejected into the surrounding water, and the air ejection will continue until the inner pressure of the casing balances with the surrounding water pressure.

Other objects and advantages will be understood from the following description of preferred embodiments, which are shown in accompanying drawings.

Figure 1:
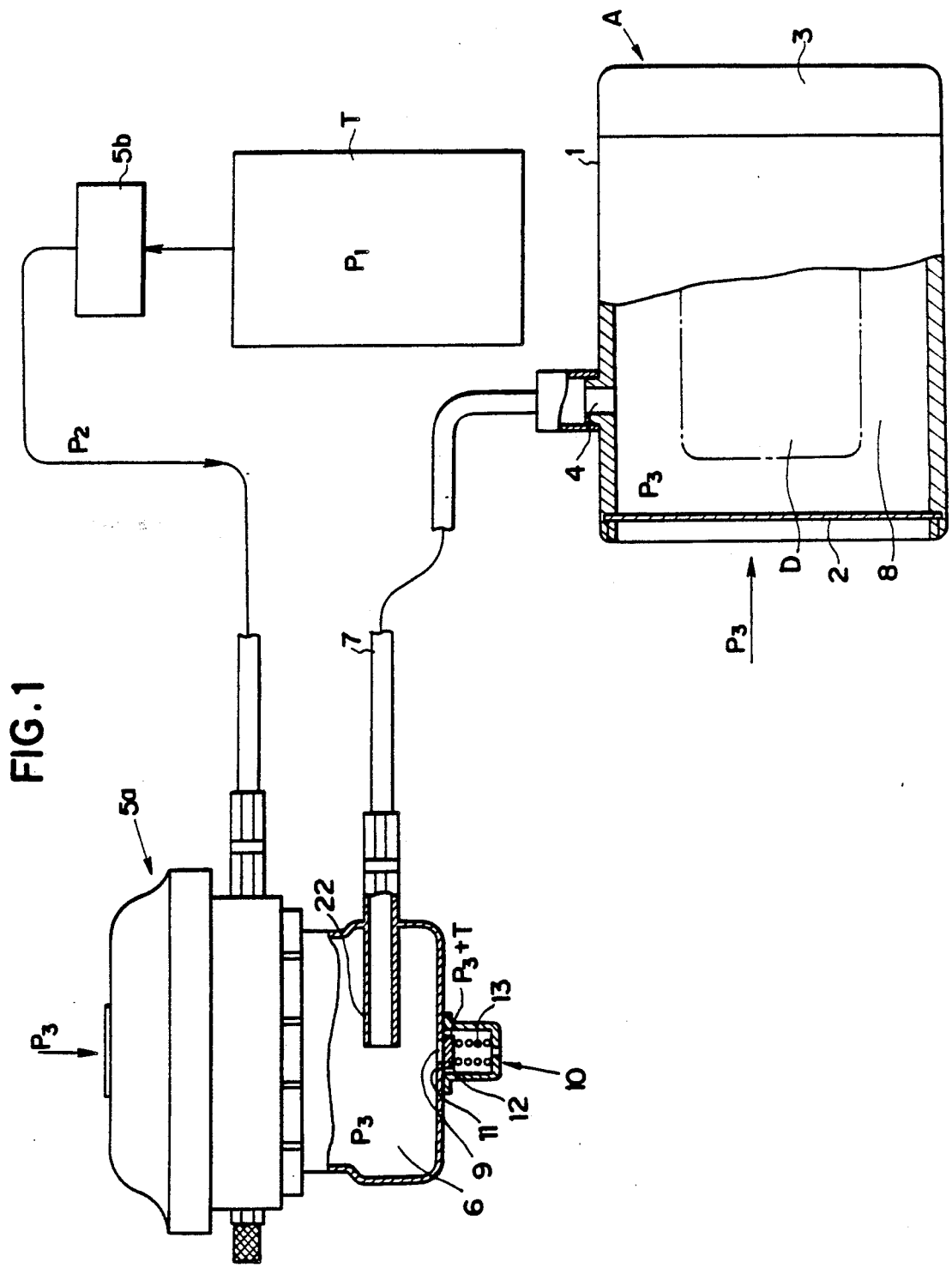
FIG. 1 shows a casing assembly according to a first embodiment of the present invention, partly in section.

First, referring to FIG. 1 there is shown a casing assembly according to the first embodiment of the present invention. As shown in the drawing, the casing has a transparent plate such as glass plate, on its one side, thereby permitting the underwater use of a camera, videocamera or flashlight by putting the article with its lens omitted if the casing is exclusively used as a container of audio devices.

This particular embodiment is described hereinafter as having such a transparent plate. A casing body is indicated at 1, and its window is indicated at 2. A rear hinged lid is indicated at 3. These together makes up a casing A. The casing may have a different shape and size appropriate for a particular use.

An air supplying hole 4 is made in the casing body 1. The primary air-compartment of a secondary pressure reducing valve 5a is connected to the primary pressure reducing valve 5b of a portable compressed air tank T for scuba diver. The secondary air-compartment 6 is connected to the air supplying hole 4 of the casing body 1 via a tube 7, thus permitting the secondary air-compartment 6 to communicate with the casing body 1. Necessary connections between the air supplying hole 4 and the tube 7, and the secondary air-compartment 6 and the tube 7 are made by using appropriately universal joint means. As shown, an exhaust hole 9 is made in the secondary air-compartment 6, and an exhaust valve 10 is fitted in the exhaust hole 9. In case the inside pressure of the casing A is higher than the surrounding water pressure, the exhaust valve 10 functions to permit air to release to the exterior until the inside pressure of the casing A balances with the surrounding water pressure. A variety of valve structures may be used, but in this particular embodiment the exhaust valve 10 is shown as comprising a valve body 12, a valve seat 11 and a return spring 13.

In use, the rear lid 3 is opened, and a camera, videocamera, flashlight, portable radio and any other article D which can be used in scuba diving, is put in the casing A. Then, the rear lid 3 is closed and locked. A scuba diver carries the casing, and swims underwater. Assume that he is swimming at a depth "H". Then, the pressure $P_1$ of the compressed air in the tank T is reduced to $P_2$ by the primary pressure reducing valve 5b. Thus, the compressed air of decreased pressure $P_2$ flows into the primary air-compartment of the secondary pressure reducing valve 5a where the air pressure is again reduced to pressure $P_3$. Thus, the air of pressure $P_3$ flows into the secondary compartment 6. Assume that the water pressure at the depth H at which the scuba diver is swimming, is $P_3$. The compressed air of reduced pressure $P_3$ results in the secondary air-compartment 6 through the action by the pressure reducing valve structure 5a at the same depth as the scuba diver. The compressed air of reduced pressure $P_3$ flows into the space 8 of the casing A via the tube 7. The surrounding water applies the same pressure $P_3$ to the casing A which is at the same depth as the secondary pressure reducing valve 5a in water. Because of the pressure balance between the inside and outside of the casing A it cannot be deformed or collapsed even if it has no thick wall or strong frame. Of course, the casing A is guaranteed free of invasion of sea water.

The valve body 12 of the exhaust valve 10 in the secondary air-compartment 6 is pushed against the valve seat 11 by the spring 13. Thus, the resultant force of surrounding water pressure $P_3$ plus the spring tension T is applied to the valve body 12 to prevent the secondary air-compartment 6 from opening. Now, assume that the scuba diver comes up to the depth "h" in water. As a result the surrounding water pressure which is applied to the valve body 12 of the exhaust valve 10 is $P'_3$, and is less than $P_3$ by $\Delta P$. Therefore, the resultant force of surrounding water pressure $P'_3$ plus the spring tension T is applied to the valve body 12 to push it against the valve seat 11. When the pressure difference $\Delta P$ is larger than the spring tension T, the exhaust valve 10 opens to allow the air to flow out until the inner pressure of the secondary air-compartment 6 balances with the surrounding water pressure. Then, the exhaust valve 10 closes to prevent air from flowing out of the secondary air-compartment 6. At the moment the inner pressure of the casing A balances with the surrounding water pressure at the depth "h" in water, and no force is applied to the inside or outside of the casing A.

As shown in FIG. 1, the casing A has a single opening 4. In case a plurality of casings A are connected to a signal secondary pressure reducing valve 5a to make up together a combination unit, it suffices that the holes of the number of the casings plus one (the exhaust hole 9 of the secondary pressure reducing valve 5a) are made in total, much less than in a conventional arrangement in which each housing has two openings made.

In this particular embodiment an exhaust valve 10 is provided to the secondary air-compartment 6 of the pressure-reducing valve 5a, but it may be provided to the casing A.

This particular embodiment is described as using a casing A to contain a camera, videocamera, flashlight, portable radio and any other article which can be used in scuba diving, but it should be understood that the casing may be a camera or any other article's casing.

Figure 2:
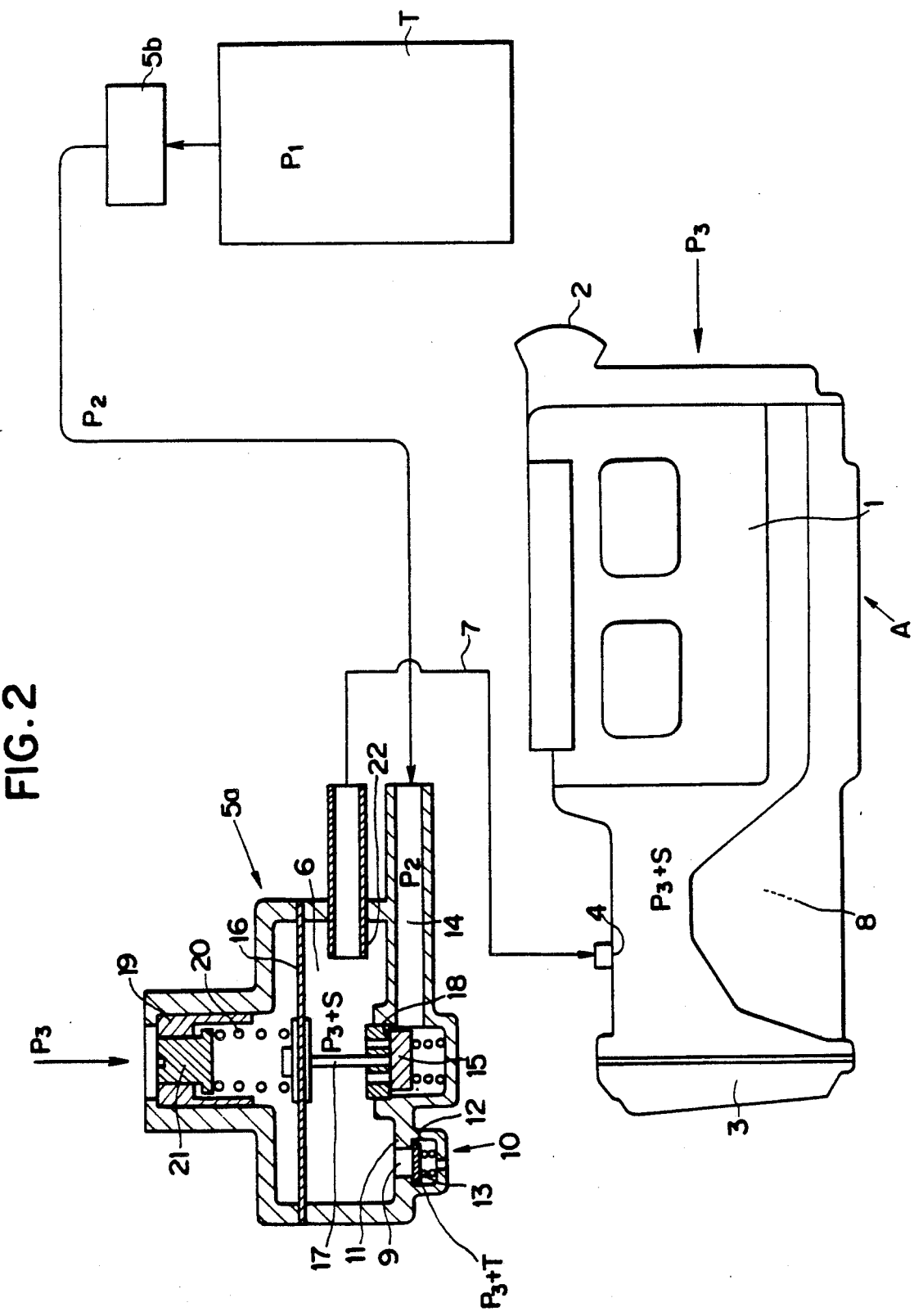
FIG. 2 shows a casing assembly according to a second embodiment of the present invention, the important unit of which is shown in section.

Referring to FIG. 2, there is shown a casing arrangement according to the second embodiment of the present invention. The same reference numerals are used to indicate the same portions and parts of the casing arrangement of FIG. 1. In describing the operation of the casing arrangement of FIG. 1 the casing A and the secondary pressure reducing valve 5a remain on the same level in water. It is, however, most likely that one of these casing and valve takes a higher level than the other in water, depending on which parts of his body a scuba diver wears these units. Assume that the casing A takes a higher level than the secondary pressure reducing valve 5a. Then, the inside pressure of the casing A, which is equal to that of the secondary pressure reducing valve 5a, is somewhat higher than the surrounding water pressure. This has the effect of preventing the invasion of seawater into the casing A even if packing or sealing members such as O-rings in the casing A deteriorate to lose their sealing effect.

The casing arrangement of FIG. 2 is designed to cause such sealing effect by intentionally keeping the inside pressure of the casing somewhat higher than the surrounding water pressure. As shown in FIG. 2, a pressure reducing valve body 15 is placed between the primary and secondary air-compartments 14 and 6. The valve body 15 is connected to a diaphragm 16 via its rod 17. If the diaphragm 16 remains in the neutral position as shown in the drawing, the valve body 15 is pushed against the seat valve 18 to prevent communication between the primary and secondary air-compartments 14 and 6.

The diaphragm 16 varies its position with the surrounding water pressure. A button-like water pressure sensor 19 is provided for the purpose. This sensor 19 may be connected directly to the diaphragm 16 via a spring 20. The button-like water pressure sensor 19 has a position control screw 21 threadedly engaged therewith for adjusting displacement of the diaphragm 16 manually from the exterior. The spring 20 is connected to the screw 21. With this arrangement if the position control screw 21 is put in a prescribed standard position, and if the surrounding water pressure $P_3$ is applied to the button-like sensor 19, the spring 20 will have a prescribed standard tension, and the diagram 16 will be displaced by an amount corresponding to the surrounding water pressure $P_3$, causing the compressed air of pressure $P_3$ to result in the secondary air-compartment 6, thereby attaining the same function as in the first embodiment of FIG. 1. If the screw 21 is driven to increase the tension T of the spring 20 above the prescribed standard tension, the diaphragm 16 is lowered accordingly by force. Thus, the compressed air of $P_3+S$ results in the secondary air-compartment 6 for the surrounding water pressure $P_3$. This resultant compressed air of $P_3+S$ flows into the inside space 8 of the casing A. Thus, the inner pressure of the casing A is higher than the surrounding water pressure $P_3$ by the quantity of pressure S. The rise of the inner pressure has the effect of preventing the invasion of sea water into the casing A even in case of deterioration of sealing material. The diaphragm may be placed in a position other than that which shown in FIG. 2, and any other control means to change the initial position of the diaphragm may be used in place of the screw control 21. A breathing mouth piece for emergency use may be connected to the exhaust valve 10, and preferably the communication conduit 7 is extended within the secondary air-compartment 6 to the extent that its end 22 is put in the vicinity of the center of the secondary air-compartment 6. Even if water should invade in the secondary air-compartment 6, it would rarely enter the conduit 7.

Figure 3:
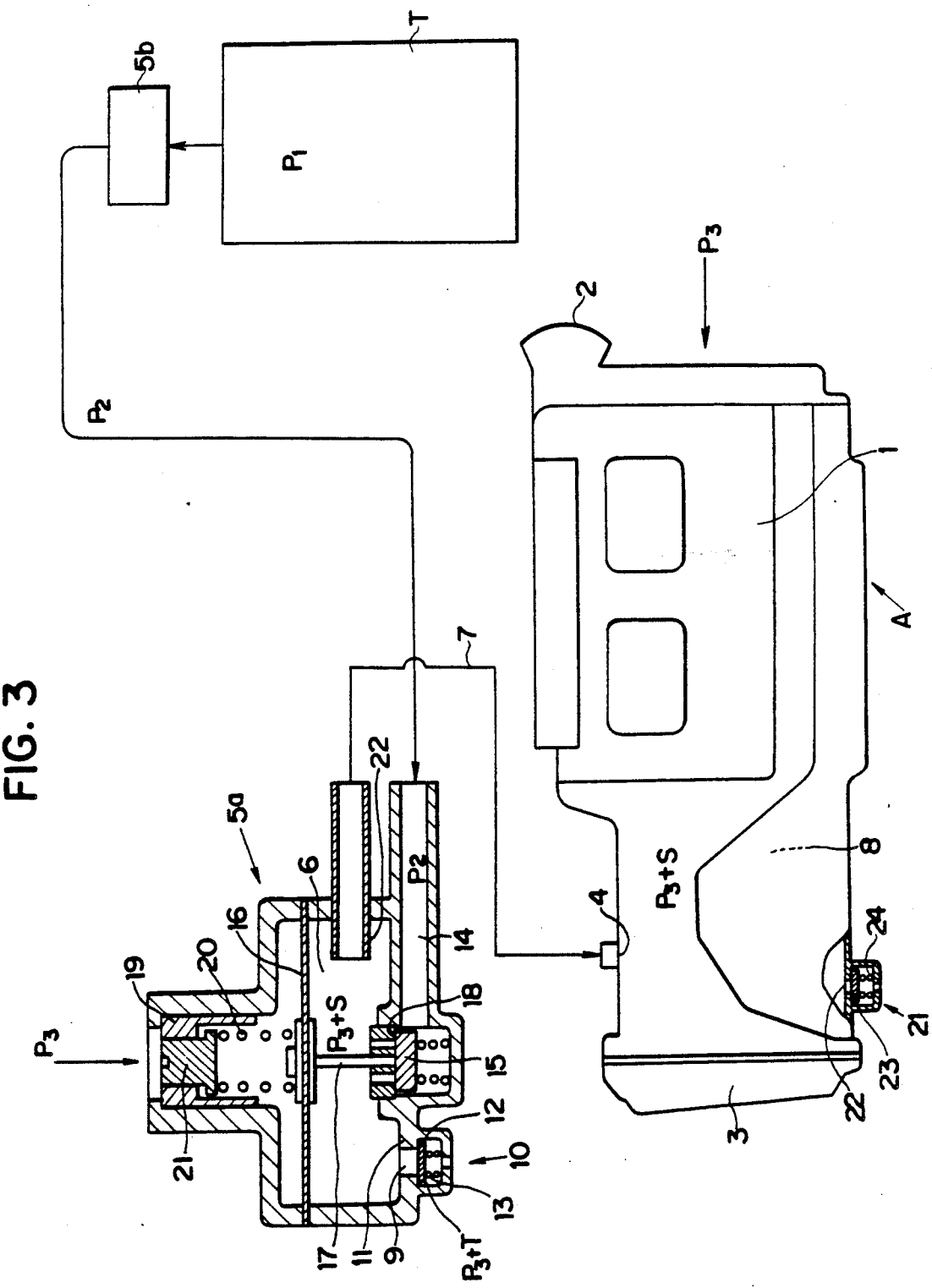
FIG. 3 shows a casing assembly according to a third embodiment of the present invention, the important unit which is shown in section.

Referring to FIG. 3, there is shown a casing assembly according to the third embodiment of the present invention. As shown, an exhaust valve 10 is provided to a secondary air-compartment 6, and an exhaust valve 21 is provided to the casing A. Valve 21 is composed of a valve body 23, a valve seat having an opening 22, and a pressing spring 24. Assume that moisture-carrying air enters the casing on land to lower the transparency of the glass of the casing A. The wet air can be purged to recover the transparency of the glass by raising the casing A above the secondary air-compartment 6 in water to supply the compressed air to the casing A, thereby causing the wet air to flow out through the exhaust valve 21.

Figure 4:
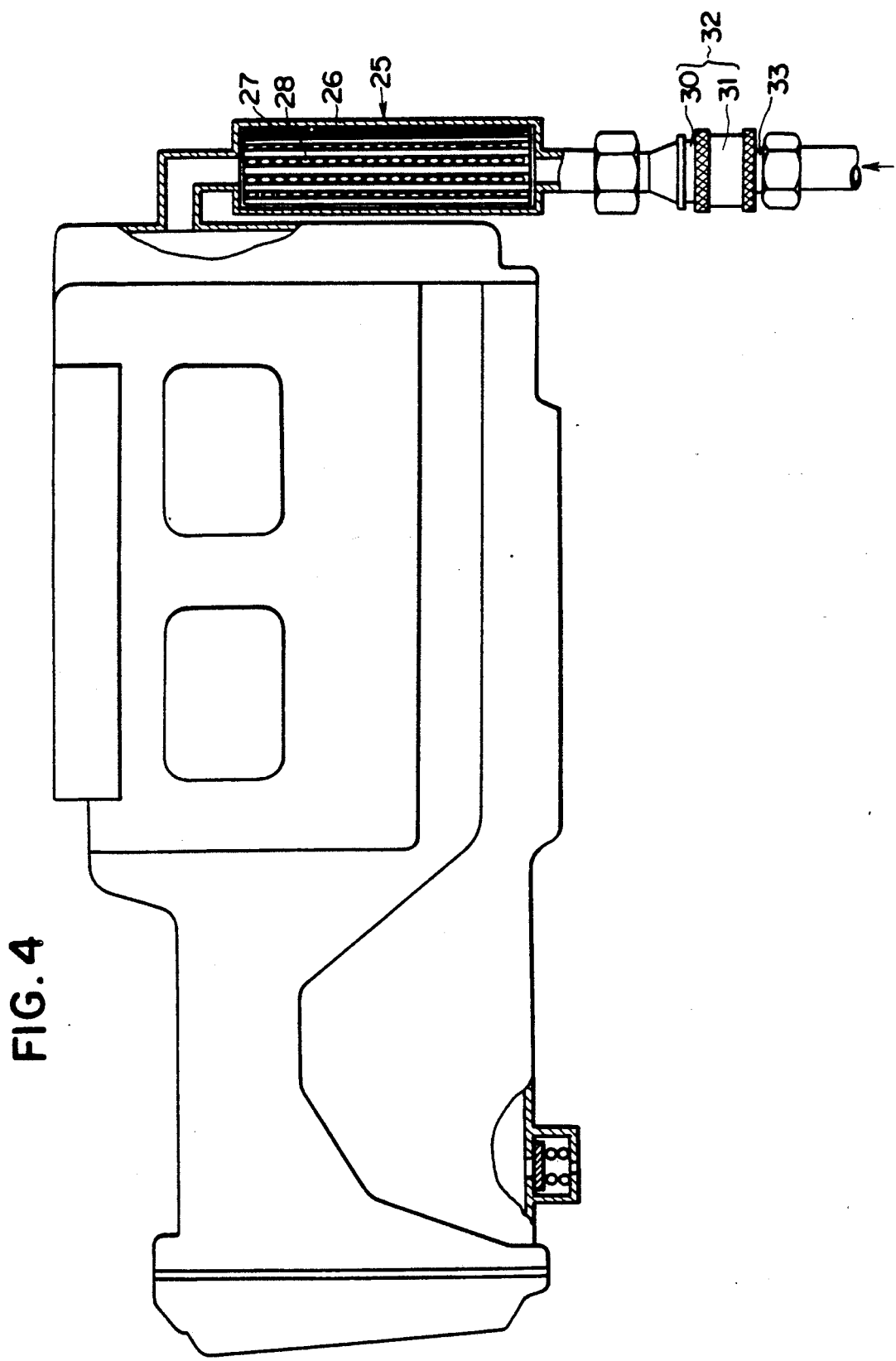
FIG. 4 shows a casing unit according to a fourth embodiment of the present invention, the attachment of which is shown in section.

Referring to FIG. 4, there is shown a casing assembly according to the fourth embodiment of the present invention. As shown, a tube connecting a casing A to a secondary pressure reducing valve 5a has a male and female joint assembly and a water-absorber. The joint assembly comprises a female joint 30, associated lock means 31 and a male joint 33. The water absorber comprises a casing 26 whose compartment space is loaded with sheet material 27 carrying a high-molecular absorbent 28. When the male and female joint parts are decoupled, the check valve structure of the joint will prevent invasion of water into the casing A, but the moisture will remain on the inside of the check valve structure. The absorbent will absorb the moisture when the male and female parts are jointed together, thus preventing invasion of moisture in the casing A.

As may be understood from the above, the casing structure according to the present invention is designed to cause the inner pressure of the casing to balance with the surrounding water pressure, and therefore it is guaranteed free from deformation, collapse or water invasion in underwater use without using a thick strong wall or frame structure.

I claim:

1. An apparatus for regulating the pressure within a submerged casing having a walled exterior and a hollow interior, comprising:
    an air source for pressurizing the interior of the casing;
    first pressure reduction means connected to the air source for reducing the pressure of the air exiting therefrom; and
    second pressure reduction means for reducing the pressure of the air exiting from the first pressure reduction means, the second pressure reduction means including:
        a primary air compartment connected to the first pressure reduction means;
        a secondary air compartment connected to the interior of the casing by a tube passing through the exterior thereof, the secondary air compartment having exhaust valve means for releasing air to the water until the pressure in the interior of the casing is equivalent to a surrounding water pressure;
        a diaphragm;
        a valve connected to the diaphragm for regulating a flow of air between the primary and secondary air compartments;
        means for varying the position of the diaphragm with respect to the second pressure reduction means in response to a change in the surrounding water pressure; and
        means for manually controlling the position of the diaphragm to increase the pressure of the interior of the casing above the surrounding water pressure.

2. An apparatus according to claim 1 wherein an exhaust valve is provided to said casing, thereby permitting the pressure difference between the inside pressure of said casing and the surrounding water pressure to release to the exterior of said casing in response to the rise of the inner pressure of said casing above the surrounding water pressure.

3. An apparatus according to claim 1 wherein said exhaust valve means of said secondary air compartment permits the pressure difference between the inside pressure of said casing and the surrounding water pressure to release to the exterior of said casing in response to the rise of the inner pressure of said casing above the surrounding water pressure, and another exhaust valve is provided to said casing.

4. An apparatus according to claim 1, wherein the casing includes an exhaust valve for purging the interior of the casing of moistened air.

5. An apparatus according to claim 1, wherein the tube connecting the secondary air compartment to the casing comprises:
    coupling means for detachably connecting the tube to the casing; and
    water absorption means for absorbing moisture entering the casing when the tube is connected to the coupling means.

6. An apparatus according to claim 5, wherein the coupling means comprises:
    a female coupling;
    a male coupling connected to the female coupling; and
    locking means, for securing the connection.

7. An apparatus according to claim 5, wherein the water absorption means comprises a high-molecular absorbent.

* * * * *